United States Patent Office 3,337,190
Patented Aug. 22, 1967

3,337,190
MIXING APPARATUS AND PROCESS
Gene H. Dettmer, St. Louis, Mo., assignor to Hooker Chemical Corporation, Niagara Falls, N.Y., a corporation of New York
Filed Oct. 19, 1966, Ser. No. 587,796
10 Claims. (Cl. 259—4)

This invention relates to a novel process and apparatus for mixing dry materials, and more particularly, relates to a process and apparatus for blending a plurality of fertilizer material into a substantially homogenous mixture.

In recent years, particularly in the agricultural chemical field, there has been an increasing demand for multi-component blended products. These products may be blended fertilizers, wherein two or more different fertilizer materials are combined to give a blended product having particular desired amounts of the various fertilizer materials. Such blended fertilizers may include mixtures of two or more of dia-ammonium phosphate, triple superphosphate, ammonium nitrate, ammonium sulfate, potash, and the like. Additionally, in many instances it is desirable to produce a blended product containing both fertilizer material and pesticidal material, such as a herbicide, or trace minerals, such as boron.

In general, it has been found to be preferable if such products can be produced by dry blending, thus obviating the need for granulators, dryers, cooling equipment, and the like, in the blending operation. Various means have heretofore been utilized to effect the desired dry blending, including various conventional mixers such as rotary drums, tumble mixers, and the like. Additionally, elevator systems, utilizing a plurality of hoppers with vibrating grates and the like, have also been used. Frequently, apparatus of the type which has heretofore been used is relatively expensive, both in terms of the initial capital investment and the continuing operating cost. Additionally, in many of the mixing devices heretofore used there is still appreciable satisfaction of the materials being mixed, often due to differences in density and particle size of these materials, so that a substantially uniform, blend mixture has not been obtained.

It is, therefore, an object of the present invention to provide an improved apparatus and method for the blending of various agricultural chemical materials to produce a substantially uniform, dry-blended multi-component product.

A further object of the present invention is to provide an improved method and apparatus for the dry blending of materials, which is relatively inexpensive both to install and to operate.

These and other objects will become apparent to those skilled in the art from a description of the invention which follows.

Figure 1:
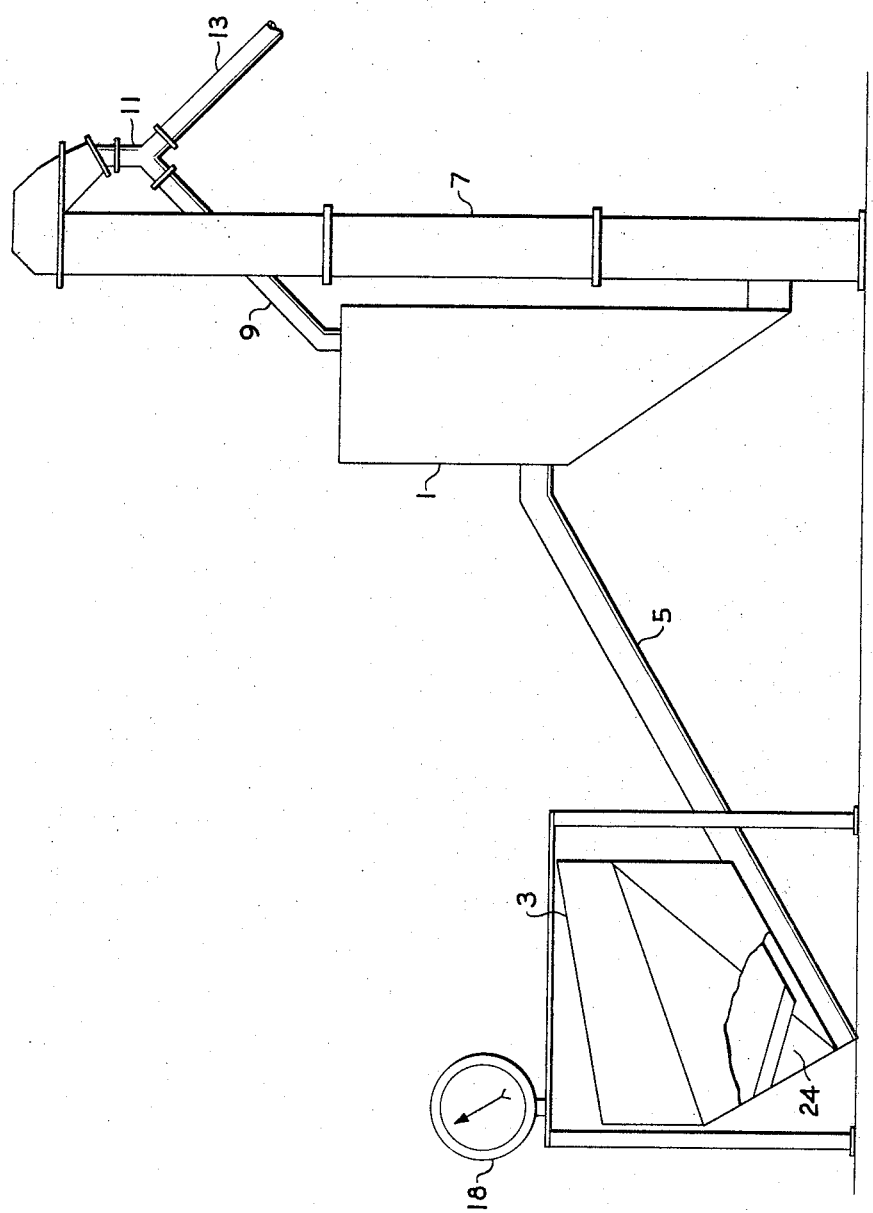
Figure 2:
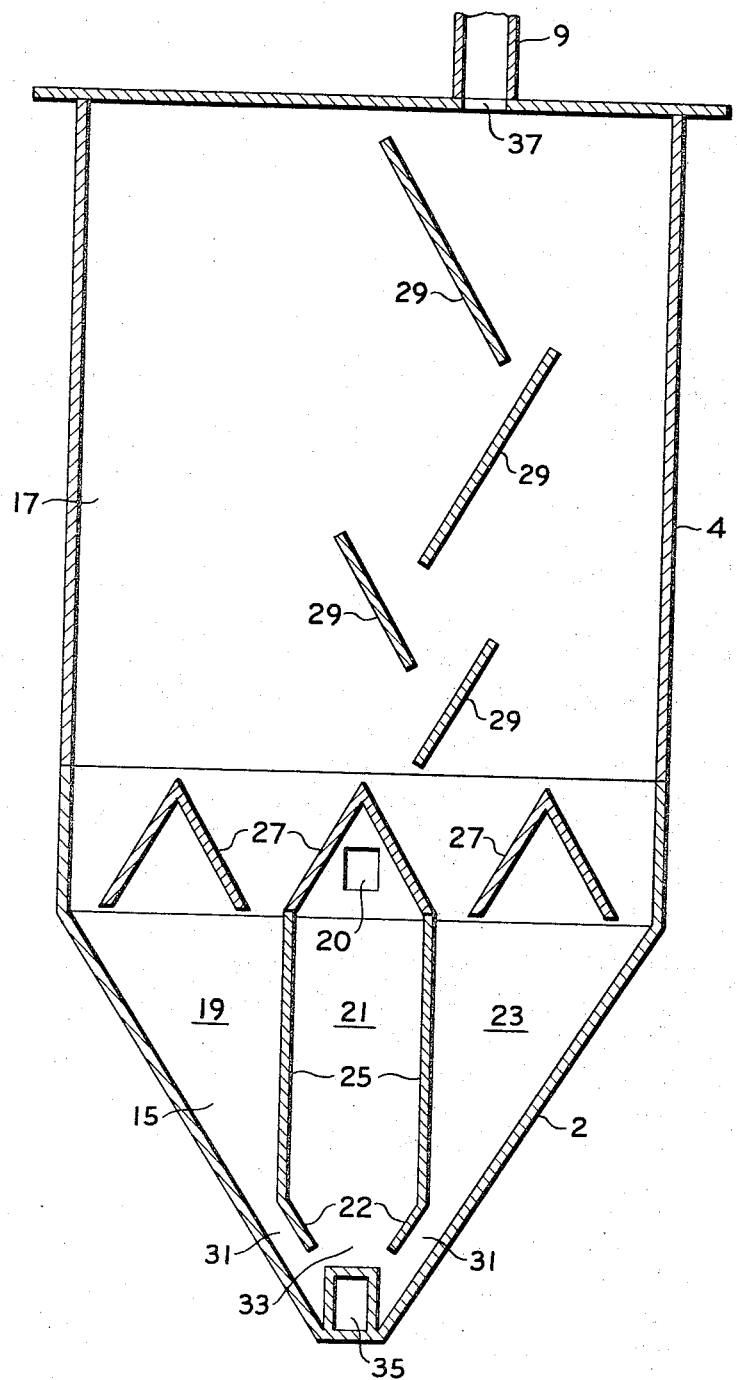
Figure 3:
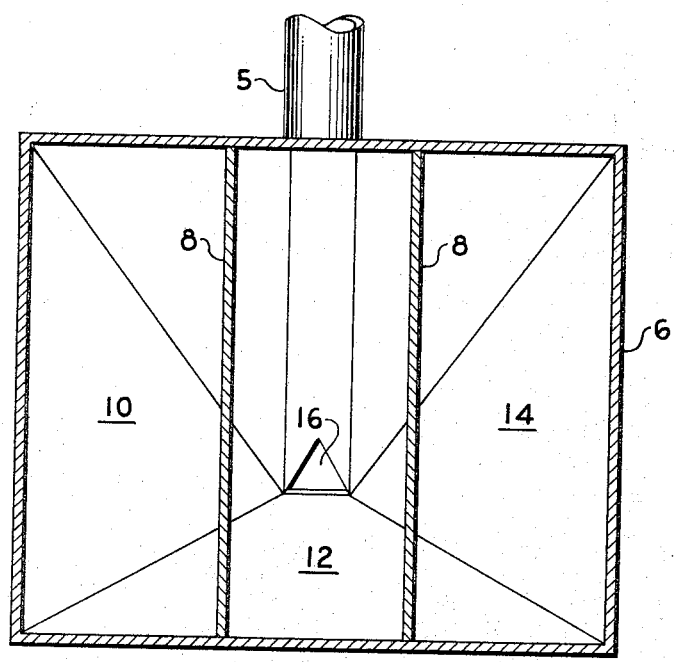
Figure 4:
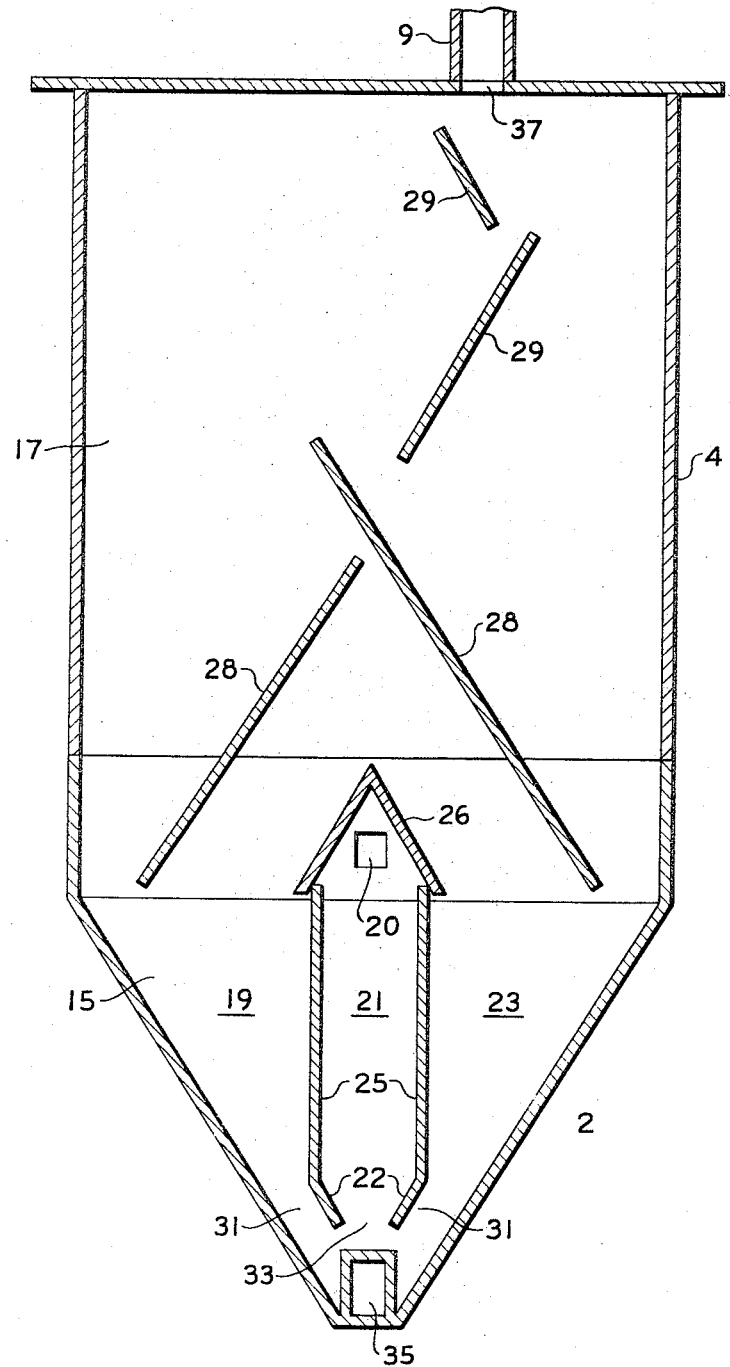

In the drawings which are attached hereto and form a part hereof, FIGURE 1 is a schematic diagram, partially in section of one embodiment of the mixing and blending apparatus of the present invention; FIGURE 2 is a sectional view of the mixer portion of the subject apparatus; FIGURE 3 is a sectional view of the loading hopper portion of the apparatus; and FIGURE 4 is a sectional view of an alternate configuration for the mixer portion of the subject apparatus.

Pursuant to the above objects, the present invention includes a process for mixing and blending which comprises premixing plurality of dry materials to be blended, introducing the thus-premixed materials into a compartmented mixing zone, removing the materials from the compartments into which they have been introduced, elevating the thus-removed materials to a point above the compartmented mixing zone, said elevation being carried out at a rate which is greater than the rate at which the dry materials are introduced into the mixing zone, discharging the thus-elevated materials back to the mixing zone, passing the thus-discharged materials in a circuitous path as they are returned to the mixing zone, collecting the materials in the compartmented mixing zone in compartments other than those into which the dry materials are originally introduced, combining the thus-collected materials with the originally introduced dry materials at a point just prior to the elevation of these materials, and repeating the above steps of elevating, discharging, passing, collecting and combining until the desired degree of blending and mixing of the dry materials is obtained.

It is to be appreciated that the expression "dry materials" as used in the specification and claims, is intended to be understood as referring to materials which are solid rather than liquid, i.e., solids rather than solutions, slurries, dispersions in a liquid and the like. Generally, these materials are dry, granular, substantially free flowing solid materials. Examples of typical dry materials which may be mixed and blended by the method of the present invention are various fertilizing materials such as dia-ammonium phosphate, triple superphosphate, ammonium phosphate, ammonium nitrate, ammonium sulfate, potash as well as other various fertilizer materials containing varying amounts of phosphorus and nitrogen as are known in the art. Additionally, other agricultural chemical materials including pesticides and particularly herbicides, such as 2,4-D; 2,4,5-T; BHC, and the like, may also be mixed by the present method to form mixed herbicidal compositions, per se, and/or blended compositions of herbicides, trace minerals and fertilizers. Coloring dyes can also be added to color the mixture. Moreover, the expression "premixing" is intended to refer to a preliminary blending of the dry materials to the extent that cycling of the materials during the remainder of the process is minimized. The mixing or blending which is effected during the premixing is not, however, that which would be sufficient to produce a substantially homogeneous product. In general, the premixing is such that there is a co-mingling of from about 10–50% of the separate components which are to be blended.

More specifically, in the practice of the present invention, a plurality of dry materials which are to be mixed or blended or first premixed. This premixing may be carried out in any convenient manner, as for example by passing the materials through a rotating drum mixer, a blade-type mixer, or the like, or by adding the components simultaneously to the compartmented mixing zone, as described hereafter. In a preferred method, the dry materials to be mixed are added, in layers to a compartmented hopper, a layer of each material being placed in each compartment of the bottom of the hopper. The materials are then removed from the hopper, one compartment at a time, onto an endless conveyor belt.

The premixed materials are then introduced into a compartmented mixing zone. The mixing zone has a plurality of separate compartments or areas, and the dry materials to be blended are introduced into these compartments. Although, if desired, the dry material may be introduced into more than one of these compartments, there should be at least one compartment into which no dry materials are initially introduced. The materials to be mixed are removed from the mixing zone elevated or raised to a point above the mixing zone and then discharged back to the mixing zone. In returning the dry materials to the mixing zone, they are passed in a circuitous path whereby mixing and blending of the materials is effected. The height to which the materials removed from the mixing zone are raised or elevated is not critical so long as it is great enough so that mixing of the dry materials is effected as they are returned by the circuitous path to the compartmented mixer. Typically, the materials are raised or elevated to a height of from 6 to 20 feet above the mixing zone, although in many instances greater or lesser heights may be used, which will give the desired mixing.

Additionally, it has been found that the rate at which the dry materials are raised to the discharge point above the mixing zone should be greater than the rate at which the dry materials are introduced into the compartmented mixing zone. Obviously, the absolute rates involved will vary, depending upon the capacity of the loading means for introducing the dry materials into the compartmented mixer and the capacity of the elevating means for raising the materials. In a typical commercial installation, loading rates into the compartmented mixing zone within the range of about 10 to 60 tons per hour and elevation rates within the range of about 30 to 120 tons per hour are typical. In many instances, elevation rates which are two to three times the loading rate into the mixing zone have been found to be desirable although both greater and lesser relative rates may be used.

The dry materials which are discharged after elevation and returned in a circuitous path to the compartmented mixing zone are collected in one or more compartments in the mixing zone, other than the compartment or compartments into which the dry materials to be mixed are initially introduced. Desirably, the dry material to be collected in the compartmented mixing zone is discharged after being elevated above the mixing zone and permitted to fall, under the force of gravity, through the circuitous path back into the mixing zone. Additionally, it is to be appreciated that in referring to passing the material into a circuitous path, it is intended to be understood that the dry material is not permitted to fall directly from the elevation point back into the mixing zone, but, rather, that this passage or fall is broken, by baffles or other means, so as to insure better mixing and distribution of the dry material.

Once the material has been returned to the compartmented mixing zone and collected in compartments other than those into which the dry materials are initially introduced, the thus, collected materials are then admixed with the dry material initially introduced, the combined mixture is elevated and the process repeated until the desired mixing and blending of the dry materials are obtained. Generally, it has been found that two or three cycles are sufficient for this purpose. The substantially completely mixed and blended material may then be withdrawn from the mixer, bagged and/or prepared for bulk shipment or storage. It is to be appreciated, that the process of the present invention may be carried out as a batch process or as a continuous process, depending upon the manner in which the dry materials to be blended are initially introduced into the mixing zone.

In addition to the process which has been described hereinabove, the present invention also includes mixing and blending apparatus which is suitable for carrying out this process. This apparatus comprises (1) a mixer having a lower, compartmented mixing zone and an upper, baffled, blending zone disposed above the mixing zone and being in communication with only some of the compartments of the mixing zone; (2) means for premixing and introducing materials to be mixed into the compartments of the mixing zone which are not in communication with the blending zone; (3) means for removing materials from the compartmented mixing zone; (4) means for elevating the materials removed above the mixing zone and discharging the thus-elevated materials into the baffled blending zone; and (5) means for combining materials introduced into the compartmented mixing zone after passing through the blending zone with the materials originally introduced into the mixing zone, said means effecting combination of the materials at substantially the point the materials originally introduced into the mixing zone are removed from the mixing zone.

More specifically, the apparatus of the present invention, as shown in FIGURE 1, includes a mixer 1, a loading and premix hopper 3, and a conveyor 5 for transporting the premixed materials to be mixed from the hopper 3 to the mixer 1. The hopper 3 is further provided with scale means 18 for weighing the materials to be mixed which are introduced therein. An elevator 7 is located adjacent to mixer 1 whereby materials are removed from the bottom of the mixer 1, elevated above the mixer and discharged into the chute 9 for return to the top of the mixer 1. A valve means 11 is provided adjacent the chute 9 for controlling the flow of materials from the elevator to the chute 9 or, alternatively, to direct the materials to the loading chute 13, from which the materials may be collected in any convenient means, such as suitable bagging apparatus or storage hopper (not shown).

The mixer 1, as shown more clearly in FIGURE 2, includes a compartmented mixing zone 15 and a baffled blending zone 17. The mixing zone 15 is formed in the lower portion of the mixer 1 by the tappered sidewalls 2, while the blending zone 17 is formed in the upper portion of the mixer 1 by the sidewalls 4. Within the mixing zone 15 there are three compartments, 19, 21 and 23. These compartments are formed by the partitions or dividing walls 25. Within the mixer 1, separating the mixing zone 15 and the blending zone 17 are three V-shaped baffle members 27. These baffle members are positioned over each of the three compartments 19, 21 and 23 of the mixing zone, the center baffle member being positioned over the center compartment 21 so as to form a cover therefor which prevents materials entering the compartment 21 from the blending zone 17. The remaining two baffles are positioned over the outer compartments 19 and 23 so as to provide the means of communication between the compartments and the blending zone 17, thus permitting the passage of materials from the blending zone into these compartments. Openings 31 are formed in the lower portion of the outer compartments 19 and 23 by the sidewalls 2 of the mixing zone and the extensions 22 of the partitions 25 within the mixing zone. Additionally, outlet 33, from the central compartment 21 in the mixing zone, is formed by the extensions 22 of the partitions 25. These openings discharge into the bottom of the mixing zone 15 to the elevator throat 35 from which materials from the three compartments 19, 21 and 23 are discharged to the elevator 7, shown in FIGURE 1. Additionally, the center compartment 21 of the mixing zone is provided with an inlet 20 through which materials are introduced by the conveyor 5.

The blending zone 17, located in the upper portion of the mixer 1 above the mixing zone 15 has formed therein a series of baffles 29 which, like the baffle members 27, extend transversely across the mixer, forming a circuitous path through the blending zone 17. An inlet 37 is provided above the baffles 29 through which materials discharged from the elevator through the chute 9 are returned and introduced into the blending zone 17.

In FIGURE 4, there is shown an alternative structure for the mixer 1. In this figure, a single baffle member 26 is provided over the center compartment 21 of the mixing zone 15, which acts as a cover over this compartment, preventing materials from the blending zone 17 from entering this compartment. Two directing baffles 28 are positioned within both the mixing zone 15 and the blending zone 17 so as to direct the blended materials from the blending zone into the two outer compartments 19 and 23 of the mixing zone. Additionally, as in the configuration shown in FIG. 2, a series of baffles 29 are provided in the blending zone 17 which baffles extend transversely across the mixer, forming a circuitous path through the blending zone 17. The inlets and outlets 31, 33, 35 and 37 and the chute 9 are positioned as has been described with respect to FIGURE 2.

Referring now to FIGURE 3, the loading hopper 3 from which materials are introduced into the mixer 1, is formed by the sloping sidewall 6. Within the hopper, there are formed three compartments 10, 12 and 14 by the dividing walls 8. Openings 24 are provided in the two divider walls 8 so as to permit communication between the outer two compartments 10 and 14 and the center compartment 12. One of these openings is larger than the other so that the layered materials are emptied, one compartment at a time, the openings not permitting material to flow until the adjacent compartment is nearly empty. An Outlet 16 is provided in the bottom of the center compartment 12 through which materials are discharged to the conveyor 5 to be transported to the mixer 1. As noted hereinabove, the loading hopper 3 is provided with scale means 18 whereby the amount of materials introduced into the hopper can be measured.

In the operation of the apparatus of the present invention, the dry materials to be mixed and blended are weighed in the desired amounts into the compartments 10, 12 and 14 of the loading hopper 3. Although the loading hopper is shown in the drawing as having three compartments, it is, of course, obvious that the hopper used may have a different number of compartments. From the compartments of the loading hopper 3, the materials to be mixed are discharged through the outlet 16 to the conveyor 5 in a premixed condition, which transports the premixed material to the mixer 1, introducing it into the center compartment 21 of the mixing zone 15 through the inlet 20. From compartment 21 of the mixing zone 15, the dry materials are discharged through the outlet 33 into the bottom of the mixing zone wherein they pass to the throat 35 of the elevator 7. The dry materials are raised to the top of elevator 7 whereupon they are discharged through chute 9 and inlet 37 into the blending zone 17 of the mixer 1, the valve 11 being positioned so as to keep the loading chute 13 closed. Within the blending zone 17, the dry materials fall in a circuitous path through the baffles 29 and are then directed by the baffles 27 into the outer compartments 19 and 23 of the mixing zone 15. The dry materials pass through the compartments 19 and 23 and are discharged through openings 31 into the bottom of the mixing zone where they are combined with the dry materials discharging through opening 33 of compartment 21 of the mixing zone, the thus-combined materials then passing into the elevator throat 35. This process is then repeated until substantially complete mixing and blending of all of the dry materials has been effected. When this has been done, the valve 11 is turned to close the chute 9 and open loading chute 13. The blended materials which are raised by the elevator 7 are then discharged through the loading chute 13 to suitable bagging equipment or storage hopper. Typically, as has been noted above, the rate at which the materials to be blended are originally introduced into the center compartment 21 of the mixing zone 15 is less than the rate at which the dry materials are raised by the elevator 7.

In an actual example, using the apparatus shown in the drawings, ammonium nitrate, diammonium phosphate and potash are added to the hopper compartments 10, 12 and 14, in amounts of 314 lbs., 2088 lbs., and 1598 lbs., a 12–24–24 fertilizer. These materials are discharged from the hopper to the conveyor 5 which transports them and introduces them into compartment 21 of the mixing zone 15 at the rate of about 50 tons per hour. These materials pass through the compartment 21 into the elevator throat 35 from which point they are raised by the elevator 7 and discharged through chute 9 back into the blending zone 17 at the rate of about 90 tons per hour. The dry materials pass through the circuitous path formed by the baffles 29 in the blending zone back to compartments 19 and 23 of the mixing zone from which the dry material is removed and combine with the material introduced into compartment 21 of the mixing zone in the elevator throat 35. This procedure is repeated for a total of about 2 cycles after which there is obtained from the discharge chute 13 a uniformly mixed and blended dry composition, which evidences substantially no stratification of the components even upon storage for extended periods of time.

It is to be appreciated that the above procedure may be repeated as a continuous process, rather than a batch process as described. In such operation, the dry materials to be blended are continuously introduced into compartment 21 of the mixing zone 13, in the relative amounts nedeed to give the desired final blended composition. Recycling of the material to be blended is then continued until substantial equilibrium conditions are reached, whereupon a portion of the blended materials are removed through the product loading chute 13 while continuing to recycle the materials through the chute 9 back into the blending zone.

It is to be appreciated, that in the apparatus described above, various changes may be made and equivalent structures may be substituted for those which have been specifically described. Thus, for example, the dry materials may be introduced directly into the mixing zone, rather than using the hopper and conveyor belt arrangement as described. Similarly, the mixing zone may be formed with only two or four or more compartments, rather than the three illustrated and the baffle members, both those separating the mixing and blending zones and those in the blending zone, may have other configurations than those illustrated.

While there have been described various embodiments of the invention, the apparatus and methods described are not intended to be understood as limiting the scope of the invention, as changes therewithin are possible and it is intended that each element recited in any of the following claims is to be understood as referring to all equivalent elements for accomplishing substantially the same result in substantially the same or equivalent manner, it being intended to cover the invention broadly in whatever form its principle may be utilized.

What is claimed is:

1. A method for mixing and blending materials which comprises premixing a plurality of dry materials to be blended, introducing the premixed materials into a compartmented mixing zone, removing the materials from the compartment into which they have been introduced, elevating the thus-removed materials to a point above the compartmented mixing zone, said elevation being carried out at a rate which is greater than the rate at which the dry materials are introduced into the mixing zone, discharging the thus-elevated materials back to the mixing zone, passing the thus-discharged materials in a circuitous path as they are returned to the mixing zone, collecting the materials in the compartmented mixing zone in compartments other than those into which the dry materials are originally introduced, combining the thus-collected materials with the originally introducing dry materials at a point just prior to the elevation of these materials and repeating the above steps until the desired degree of blending and mixing of the dry materials is obtained.

2. The method as claimed in claim 1 wherein the rate at which the dry materials to be mixed are introduced into the mixing zone is within the range of about 10 to 60 tons per hour and the rate at which the materials are removed from the mixing zone and elevated is within the range of about 30 to 120 tons per hour.

3. The method as claimed in claim 2 wherein the rate at which the materials are removed from the mixing zone and elevated is from about 2 to 3 times the rate at which the materials to be mixed are originally introduced into the mixing zone.

4. The method as claimed in claim 2 wherein the premixing of the dry materials is effected by placing the dry materials to be mixed in layers in a compartmented hopper zone and, thereafter, discharging the layered materials from each compartment into the compartmented mixing zone, the materials being discharged from only one compartment at a time.

5. Mixing and blending apparatus which comprises (1) a mixer having a lower, compartmented mixing zone and an upper, baffled blending zone disposed above the mixing zone and being in communication with some, but less than all, of the compartments of the mixing zone; (2) means for premixing and introducing materials to be mixed into the compartments of the mixing zone which are not in communication with the blending zone; (3) means for removing materials from the compartmented mixing zone; (4) means for elevating the materials removed from the mixing zone and discharging the thus-elevated materials into the baffled blending zone; and (5) means for combining materials introduced into the compartmented mixing zone after passing through the blending zone with materials originally introduced into the mixing zone, said means effecting combination of these materials at substantially the point the materials originally introduced are removed from the mixing zone.

6. The apparatus as claimed in claim 5 wherein the mixing zone contains at least three compartments, one of which is not in communication with the blending zone, which compartment has an inlet therein through which the premixed materials to be blended are originally introduced.

7. The apparatus as claimed in claim 6 wherein baffle members are provided between the mixing zone and the blending zone of the mixer, which baffle members are positioned so as to direct the dry materials to be mixed from the blending zone away from the mixing zone compartment into which the dry materials are originally introduced and into the other compartments of the mixing zone.

8. The apparatus as claimed in claim 7 wherein the blending zone of the mixer is provided with a series of baffles which form a circuitous path through the blending zone through which dry materials introduced into the blending zone are passed.

9. The apparatus as claimed in claim 8 wherein discharge openings are provided in the lower portion of each of the compartments of the mixing zone, which openings are in communication with elevator means for raising the materials discharged from the compartments to a point above the mixing zone.

10. The apparatus as claimed in claim 9 wherein the means for premixing the dry materials and introducing them into the mixing zone includes a hopper having a plurality of vertically disposed compartments, and a conveyor belt, one of the compartments of said hopper being in communication with said conveyor belt and all of the other hopper compartments and the conveyor belt being disposed so as to receive materials from said hopper and transport them into said mixing zone.

References Cited
UNITED STATES PATENTS

| | | | |
|---|---|---|---|
| 829,127 | 8/1906 | Strauss | 259—150 |
| 1,884,423 | 10/1932 | Walker | 259—150 |
| 2,593,425 | 4/1952 | Evans | 259—180 |
| 3,259,375 | 7/1966 | Sackett | 259—180 |
| 3,275,304 | 9/1966 | Brundrett | 259—180 |

WALTER A. SCHEEL, *Primary Examiner.*

R. W. JENKINS, *Assistant Examiner.*